Figure 1:
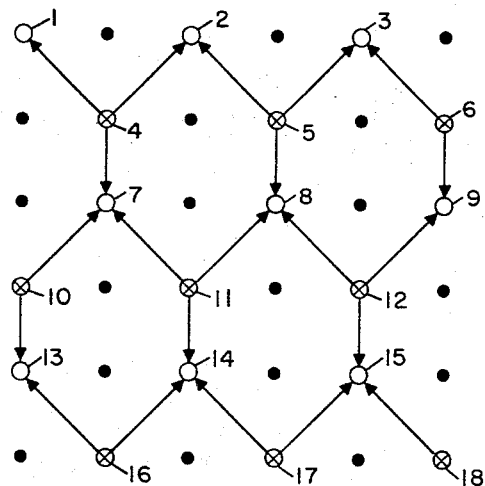

Aug. 29, 1967  C. R. JOHNSON ETAL  3,338,094
TEST PATTERN FOR MULTI-WELL SURVEY
Filed Aug. 11, 1964

Carlton R. Johnson
Edward G. Woods
INVENTORS.

BY *Gary C. Honeycutt*
ATTORNEY

United States Patent Office 3,338,094
Patented Aug. 29, 1967

3,338,094
TEST PATTERN FOR MULTI-WELL SURVEY
Carlton R. Johnson and Edward G. Woods, Tulsa, Okla., assignors, by mesne assignments, to Esso Production Research Company, Houston, Tex., a corporation of Delaware
Filed Aug. 11, 1964, Ser. No. 388,869
9 Claims. (Cl. 73—155)

This invention relates to the testing of porous subterranean reservoirs for the purpose of evaluating field scale heterogeneities. A method is provided for surveying a multi-well reservoir to determine the areal distribution of heterogeneities by testing successive well pairs. More particularly the method of the invention relates to the survey of a field by testing well pairs in a critical sequence to form a three-directional test pattern at selected wells.

The continuing effort to achieve an efficient, economic recovery of oil and gas from natural underground reservoirs has given rise to the development of numerous techniques for testing and measuring the behavior of reservoir fluids and matrices. A principal limitation of most current techniques however, is that reservoir analyses and description are based upon samples and physical measurements of an extremely small fraction of the entire reservoir, namely, the fraction occupied by well bores. However, substantial variations in reservoir properties frequently occur between wells, invalidating conclusions reached by the usual interpolation of data between these widely scattered observation points. Accordingly, it is an object of the present invention to overcome this limitation by obtaining a direct measure of reservoir properties between wells and to completely survey a multi-well reservoir by testing well pairs in a critical sequence to obtain a three-directional test pattern.

A specific example of between-wells testing to be used in surveying a reservoir in accordance with the present invention is the pulse-testing method disclosed in the copending application of Robert A. Greenkorn and Carlton R. Johnson, "Method for Determining Reservoir Heterogeneities," Ser. No. 323,651, filed Nov. 14, 1963, now abandoned. The pulse-testing method is generally characterized by the step of introducing a small change in the fluid energy content of a reservoir at a given point, and thereafter determining the effect of the change at one or more space points within the reservoir. For example, the flow rate into an injection well, or from a production well, is changed slightly and the influence of the change is then determined at one or more spaced wells. It has been discovered that the velocity and amplitude of the resulting pressure disturbance are a direct measure of the fluid transmissibility between the input well and the responsive well.

It is frequently desirable to transmit a pattern of pressure changes, or a plurality of pulses into the reservoir through the input well and to detect a corresponding pattern or plurality of output pulses at the responsive well. Treatment of the responsive signals by conventional correlation techniques makes it possible to identify the character of these signals independently of interfering pressure disturbances such as those due to routine field operations, atmospheric variations, earth tides, and the like.

The generation of a pressure pulse at a well is typically achieved by changing from one flow rate to another, whether injection or production flow as the case may be, and then returning the well to its initial rate of flow. The input pulse amplitude is the difference between the initial and the adjusted rates of flow. A suitable pulse amplitude may be generated by a change in the flow rate ranging from 30 barrels per day up to as much as 5,000 barrels per day or more, depending upon reservoir transmissibility and well spacing. That is, a 30 barrels per day change of flow rate may be adequate between wells spaced less than a hundred feet apart in a reservoir having limited transmissibility, whereas a 5,000 barrels per day change in flow rate may be conveniently feasible in a reservoir having unusually high transmissibility, and wherein the well spacing is in excess of one mile.

The duration of a pulse is the time interval during which the adjusted flow rate is maintained. Suitable pulse durations require that the adjusted rate be maintained for at least 5 seconds and as much as several hours, depending primarily upon the selected difference between the adjusted flow rate and the normal flow rate of a given well. For example a strong pulse is generated by shutting in a 5,000 barrels per day well for a few seconds, while it would take a matter of hours to generate a substantial pulse by shutting in a 30 barrels per day flow.

If a test is being run to determine only the arrival time or velocity of a pressure pulse, then a single pressure change at the input well is usually adequate. Moreover, the input disturbance may be generated by a stepwise progression of increasing flow rates or a step-wise progression of decreasing flow rates. However, to obtain additional information from the output pulse amplitude and shape, it is preferable to generate an input signal characterized by a first pressure change (increase or decrease) followed by a return to the original pressure after a short time.

In certain instances, a single change of flow rate at the input well may not provide a clearly identifiable response at an adjacent well because the difficulty of distinguishing the desired response from inherent "background" pressure fluctuations. As a practical matter therefore it is sometimes necessary to initiate a plurality of flow rate changes, pulses, or other "intelligent" pattern of pressure variation at the input well, to provide an unmistakable responsive pattern of pressure change in an adjacent well.

Accordingly, suitable input pulse durations and amplitudes for use in a given area are best determined by first monitoring the background pressure fluctuations in a representative number of wells. A stable reservoir characterized by small or negligibly inherent pressure fluctuations is amenable to pulse testing with a relatively weak pressure disturbance, whereas a stronger pulse is required in a less stable reservoir. Pulse amplitude and duration are preferably selected to maximize the contrast between the desired pressure response and the natural background variations.

The responsive pressure change is generally detected by means of a very sensitive pressure measuring device located either directly in a responsive well bore or connected to the well head at the surface. In most reservoirs, the responsive signal will be less than 0.1 p.s.i. and generally less than 0.01 p.s.i. In a few reservoirs, due to their extremely high transmissibilities, responsive pressure changes of as much as 2 p.s.i. have been observed. Responses of this magnitude, however, are less preferred since they are usually susceptible to a substantial influence from portions of the reservoir outside the vicinity of the well pair under investigation.

FIGURE 1 represents an areal view of a reservoir drilled with rectangular well spacing, such as is standard in the United States and Canada. The field is pulse-test surveyed to provide three directions of pulsing from a pulsed well, and three directions of response in a responsive well, by proceeding in accordance with the present invention. Highly sensitive differential pressure measuring apparatus is installed at wells 1, 2 and 7. A pressure pulse, or series of pressure pulses, is then generated at well 4, and a responsive pattern of pressure changes is recorded at each of wells 1, 2 and 7.

Next the pulse detecting instruments are installed at wells 2, 3 and 8, and a pulse or a series of pulses is generated at well 5. A responsive pattern of differential pressure is recorded at each of wells 2, 3 and 8.

Subsequently wells 6, 10–12 and 16–18 are pulsed, in succession, and the corresponding pattern of responsive pressure changes is recorded in each instance at three adjacent wells in the manner described for wells 4 and 5, except for boundary wells, which are not surrounded by as many as three adjacent wells. Preferably, each pulse or series of pulses is given the same character, e.g., the same amplitude and duration, in order to simplify a comparison of the responsive pressure changes. Ultimately, the entire reservoir is surveyed in a manner which provides a maximum amount of information with a minimum number of individual pulsing operations.

It is equally feasible to obtain the same pulse-test survey using a single recording instrument, by pulsing sequentially each of three wells surrounding a well at which the device is located. For example, a pulse-testing instrument may be installed first at well 7, and each of wells 4, 10 and 11 may be separately pulsed. It will be apparent that useful pulse-survey data cannot be obtained by a simultaneous pulsing of wells 4, 10 and 11, since the recording instrument at well 7 could not readily distinguish one responsive pressure disturbance from another. Moreover, the closely spaced arrival of three pulses from separate directions would present a problem, due to substantial interference of the disturbances with one another, even if it were somehow possible to identify distinguishing characteristics of the separate pulses, or to provide a directional sensitivity for the recording instrument. Subsequently, the pulse detecting instrument may be installed at well 8, while wells 5, 11 and 12 are sequentially pulsed to provide separate responsive patterns at well 8. Thereafter, the recording device would be installed at each of the remaining responsive wells to obtain a separate responsive pattern from pulsing each of the surrounding wells in sequence. In the event only one pulse detecting apparatus is available, the advantage of this latter technique is apparent.

An essential concept of the invention is to provide three directions of pulsing from a pulsed well, and three directions of response at a responsive well. Preferably, the pulse velocity is determined in three directions from each pulsed well, and in three directions at each responsive well. It is not necessary that the three directions form equal angles (120°). For example, in the embodiment of FIGURE 1 two angles of 135° and one 90° angle are formed about each well. It is necessary, however, that no two of the directions form an angle of approximately 180°, since the formation of such an angle would, in effect, reduce the two directions to a single direction.

A three directional survey at each well permits the location of oriented vertical fractures and other anisotropic heterogeneities such as directional permeabilities, in addition to the primary purpose of determining the gross areal distribution of transmissibility. A rectangular pulse-testing pattern, for example, would be inadequate to detect vertical fracturing, in the event the fracture orientation forms substantially equal angles (45°) with each of the perpendicular directions characteristic of a rectanuglar pattern.

It will be noted that for rectangular spacing, two-fifths of all the wells are by-passed by the test pattern of the invention. Generally, the additional information which would be obtained by including these wells in the survey would not justify the added time and expense which would be required. However, once the survey of gross heterogeneities is completed, additional testing between various by-passed well pairs may be justified, particularly in those areas having the greatest degree of anisotropy as indicated by the general survey.

Figure 2:
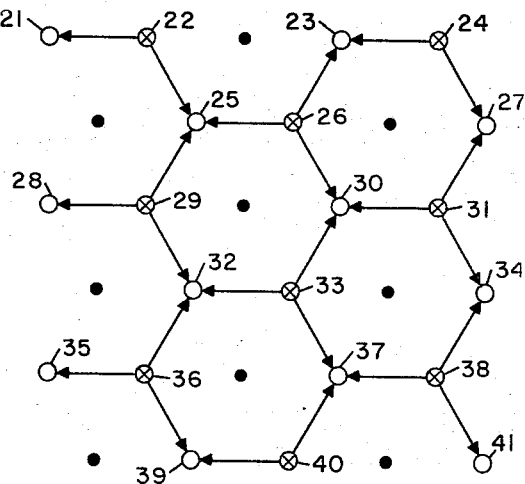

Referring to FIGURE 2 the test pattern of the present invention is applied to triangular or "7-spot" well spacing.

As in the embodiment of FIGURE 1, four wells are involved in each individual pulsing operation. For example, pulse detectors are installed at each of wells 23, 25 and 30, and a pulse or a series of pulses is generated at well 26, centrally located with respect to the three responsive wells. Subsequently, well 29 is pulsed and the resulting pressure disturbance is measured at each of wells 25, 28 and 32. Thereafter, the indicated testing pattern is completed by moving in sequence to the remaining well-pair combinations, generating a pulse or series of pulses at each centrally located well of the various four well groups, and recording the pressure disturbances created at each of the three surrounding wells.

As indicated previously with respect to the pattern of FIGURE 1, it will now be apparent that the pulse-survey pattern of FIGURE 2 may be obtained with a single recording device, for example by installing the device at well 25 and sequentially pulsing wells 22, 26 and 29 to provide a separate responsive pattern of differential pressure changes at well 25. Thereafter, by installing the pulse detecting instrument at each of the remaining responsive wells, in any desired order, and sequentially pulsing the surrounding adjacent wells, the same pulse-test survey can be obtained as outlined above for the concurrent use of three detecting instruments.

Figure 3:
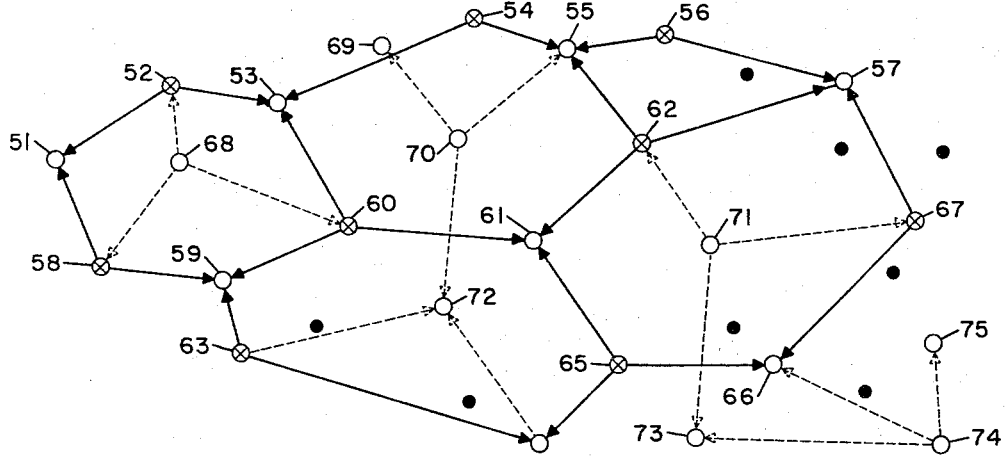

In FIGURE 3 an irregular pattern of well spacing is shown which represents the existing pattern of an actual oil field. The indicated pulse-test survey pattern is not the only pattern, within the scope of the present invention, which could be applied to the reservoir. However, it clearly illustrates the applicability of the invention to irregular well spacing, as well as to the rectangular and triangular patterns of FIGURES 1 and 2.

In this reservoir a preliminary pulse-test survey is completed in accordance with the hexagonal patterns outlined by the solid arrows. That is, wells 52, 54, 56, 58, 60, 62, 63, 65 and 67 are pulsed, in any desired sequence, while the resulting pressure disturbances are recorded at wells 51, 53, 55, 57, 59, 61, 64 and 66. At this point in the survey only about half the wells involved in the survey are tested in three directions as specified by the concept of the invention. A complete embodiment, within the broadest scope of the invention, is illustrated by testing in three directions from a single well. However, it will be apparent to one skilled in the art that practical applications of the invention, in most instances, will involve three-directional testing from a large number of wells.

Although the test survey indicated by the solid arrows (FIGURE 3) is adequate for preliminary purposes, it will normally be desired to intensify the survey by providing a three-directional test pattern at various boundary wells, which thus far are tested in two directions only. For example wells 68, 70 and 71 are pulsed to complete a three-directional test pattern at wells 52, 58 and 67. Additionally, by pulsing wells 63 and 64 a three-directional test pattern may be completed for these wells and for well 72. Further optional testing is indicated by the dotted arrows connecting wells 66, 73, 74 and 75. It is desirable, typically, to provide three-directional testing at a substantial number of wells, and it is preferable to provide three-directional testing at each well selected for testing.

Although the invention has been described with particular reference to pulse testing between successive well pairs, other methods of between-wells testing are also included within the scope of the invention. For example, as disclosed in U.S. 2,207,281, it is known to pass a seismic or acoustic pulse between wells for the purpose of determining rock properties independently of fluid transmissibility. Whenever a field is to be surveyed by these or any other method of sequential testing between well pairs, the test pattern of the invention will be applicable.

What is claimed is:

1. In a process for determining fluid transmissibility in a porous subterranean reservoir penetrated by a plurality of wells, wherein a fluid pressure transient is propagated between successive well pairs and the time required for each transient to traverse the reservoir between wells is determined, the improved method of completing a survey of the reservoir which comprises measuring the time required for each transient to traverse the reservoir in three noncollinear directions from a pulsed well and recording three separate pressure transients from three noncollinear directions at a responding well to permit the determination of the presence and orientation of reservoir heterogeneities.

2. In a method of determining fluid transmissibility in a porous subterranean reservoir penetrated by a rectangular grid of well bores, wherein a fluid pressure transient is propagated between successive well pairs, and wherein the time lag of the respective pressure transients in traversing the corresponding between-wells portion of the reservoir is determined, the improvement which comprises pulsing only alternate wells of alternate rows, in at least a portion of the reservoir, to form a triangular pattern of pulsed wells, and measuring the time required for each transient to traverse the reservoir in three noncollinear directions from a pulsed well to permit the determination of the presence and orientation of reservoir heterogeneities.

3. In a method for determining the areal distribution of fluid transmissibility in a porous subterranean reservoir penetrated by a triangular grid of well bores, wherein a fluid flow rate pulse is propagated between successive well pairs, and wherein the time required for the resulting pressure transient to traverse the corresponding between-wells portions of the reservoir is determined, the improvement which comprises pulsing only every third well of a linear row of wells, and measuring the time required for a pressure transient to traverse the reservoir in three equiangular directions from each pulsed well to permit the determination of the presence and orientation of reservoir heterogeneities.

4. A method for determining the areal distribution of fluid transmissibility in a porous subterranean reservoir penetrated by a plurality of wells, which comprises propagating a fluid pressure transient between successive combinations of pulsed wells and responding wells, measuring the time required for the resulting pressure transients to traverse the reservoir between wells, measuring the amplitude of said pressure transient at each of said responding wells, measuring the time lag and response amplitude in three noncollinear directions from a pulsed well and recording the time lag and response amplitude of three separate transients from three noncollinear directions at a responsive well to permit the determination of the presence, orientation and degree of reservoir heterogeneities.

5. A method for determining the areal distribution of fluid transmissibility in a porous subterranean reservoir penetrated by a rectangular grid of wells, which comprises propagating a fluid flow-rate pulse between successive well pairs, determining the time lag and response amplitude of the resulting pressure transients in traversing the corresponding between-wells portions of the reservoir, pulsing only alternate wells of alternate rows, in at least a portion of the reservoir, to form a triangular pattern of pulsed wells, and measuring the time lag and response amplitude of a pressure transient in three noncollinear directions from a pulsed well to permit the determination of the presence, orientation and degree of reservoir heterogeneities.

6. A method for determining the areal distribution of fluid transmissibility in a porous subterranean reservoir penetrated by a triangular grid of well bores, which comprises propagating a fluid flow-rate transient successively from every third well along at least a portion of each row of the three sets of parallel linear rows of wells defined by extending the sides of each triangle of the triangular grid, and determining the time lag and response amplitude in three noncollinear directions from a pulsed well by detecting the arrival of the pressure transient at each of three adjacent wells to permit the determination of the presence, orientation and degree of reservoir heterogeneities.

7. A method for determining the areal distribution of rock character and the continuity of individual earth strata in an area penetrated by a plurality of wells which comprises propagating a series of seismic pulses between successive well pairs, determining the velocity of the respective pulses in traversing between-wells strata, measuring the pulse velocity in three noncollinear directions from a source well and recording pulses from three noncollinear directions at a responsive well to permit the determination of the presence and orientation of reservoir heterogeneities.

8. In a method for determining the areal distribution of rock character at various levels within the earth, in an area penetrated by a rectangular grid of well bores, wherein a seismic pulse is propagated between successive well pairs, and wherein the velocity of the respective pulses in traversing the corresponding between-wells portions of the earth is determined, the improvement which comprises pulsing only alternate wells of alternate rows to form a triangular pattern of pulsed wells, and measuring each successive pulse in three noncollinear directions from a pulsed well to permit the determination of the presence and orientation of reservoir heterogeneities.

9. In a method for determining the areal distribution of rock character at various levels within the earth, in an area penetrated by a triangular grid of well bores, wherein a seismic pulse is propagated between successive well pairs, and wherein the velocity of the respective pulses in traversing the corresponding between-wells portions of the earth is determined, the improvement which comprises pulsing only every third well of each linear row of wells, and measuring a pulse in three equiangular directions from a pulsed well to permit the determination of the presence and orientation of reservoir heterogeneities.

References Cited
UNITED STATES PATENTS

| | | | |
|---|---|---|---|
| 2,117,365 | 5/1938 | Salvatori et al. | |
| 2,207,281 | 7/1940 | Athy et al. | 73—152 X |
| 3,180,142 | 4/1965 | Bombardieri | 73—155 |
| 3,193,004 | 7/1965 | Albright et al. | 166—4 |

JAMES J. GILL, *Acting Primary Examiner.*

RICHARD C. QUEISSER, *Examiner.*

J. W. MYRACLE, *Assistant Examiner.*